US008581693B2

(12) United States Patent
Spencer et al.

(10) Patent No.: US 8,581,693 B2
(45) Date of Patent: Nov. 12, 2013

(54) PASSENGER FLOW MONITORING METHOD AND SYSTEM

(75) Inventors: Jason Spencer, Worth (GB); Gabi Vago, London (GB); Danny Stern, London (GB); Yochai Legum, London (GB)

(73) Assignee: ICTS Europe Systems Ltd., London (GB)

( * ) Notice: Subject to any disclaimer, the term of this patent is extended or adjusted under 35 U.S.C. 154(b) by 159 days.

(21) Appl. No.: 13/011,694

(22) Filed: Jan. 21, 2011

(65) Prior Publication Data

US 2011/0227697 A1    Sep. 22, 2011

Related U.S. Application Data

(60) Provisional application No. 61/297,703, filed on Jan. 22, 2010.

(51) Int. Cl.
| | |
|---|---|
| *G05B 19/00* | (2006.01) |
| *G05B 23/00* | (2006.01) |
| *G06F 7/00* | (2006.01) |
| *G06Q 50/00* | (2012.01) |
| *G06Q 10/00* | (2012.01) |

(52) U.S. Cl.
USPC ........... 340/5.6; 340/5.61; 340/5.65; 340/5.8; 705/28; 705/6

(58) Field of Classification Search
USPC .................... 340/5.6, 5.61, 5.65, 5.8
See application file for complete search history.

(56) References Cited

U.S. PATENT DOCUMENTS

| | | | | |
|---|---|---|---|---|
| 6,292,092 | B1 * | 9/2001 | Chow et al. | 340/5.6 |
| 7,126,470 | B2 * | 10/2006 | Clift et al. | 340/539.13 |
| 7,617,136 | B1 * | 11/2009 | Lessing et al. | 705/28 |
| 7,705,731 | B2 * | 4/2010 | Trammell, III | 340/568.1 |
| 2001/0054951 | A1 * | 12/2001 | Kimoto et al. | 340/5.53 |
| 2003/0061080 | A1 * | 3/2003 | Ross | 705/6 |
| 2003/0085808 | A1 * | 5/2003 | Goldberg | 340/531 |
| 2005/0065834 | A1 * | 3/2005 | Hale et al. | 705/8 |
| 2009/0284343 | A1 * | 11/2009 | Ambrefe et al. | 340/5.2 |

\* cited by examiner

*Primary Examiner* — Daniel Wu
*Assistant Examiner* — Emily C Terrell
(74) *Attorney, Agent, or Firm* — Foley & Lardner, LLP

(57) ABSTRACT

A method for passenger flow is described. A boarding pass identifier of a boarding pass is electronically identified at a workstation of one or more first workstations at a first level. Boarding pass information associated with the identified boarding pass identifier is electronically retrieved at the workstation. It is determined, via one or more computers, whether the boarding pass is valid based on the retrieved boarding pass information. If the boarding pass is determined valid, a holder of the boarding pass is directed, via one or more computers, to a queue for one workstation of a plurality of second workstations at a second level based on the retrieved boarding pass information. Each workstation of the second workstations has a different queue arranged before the workstation. If the boarding pass is determined not valid, the boarding pass holder is directed away from entering the queues. A system is also described.

28 Claims, 6 Drawing Sheets

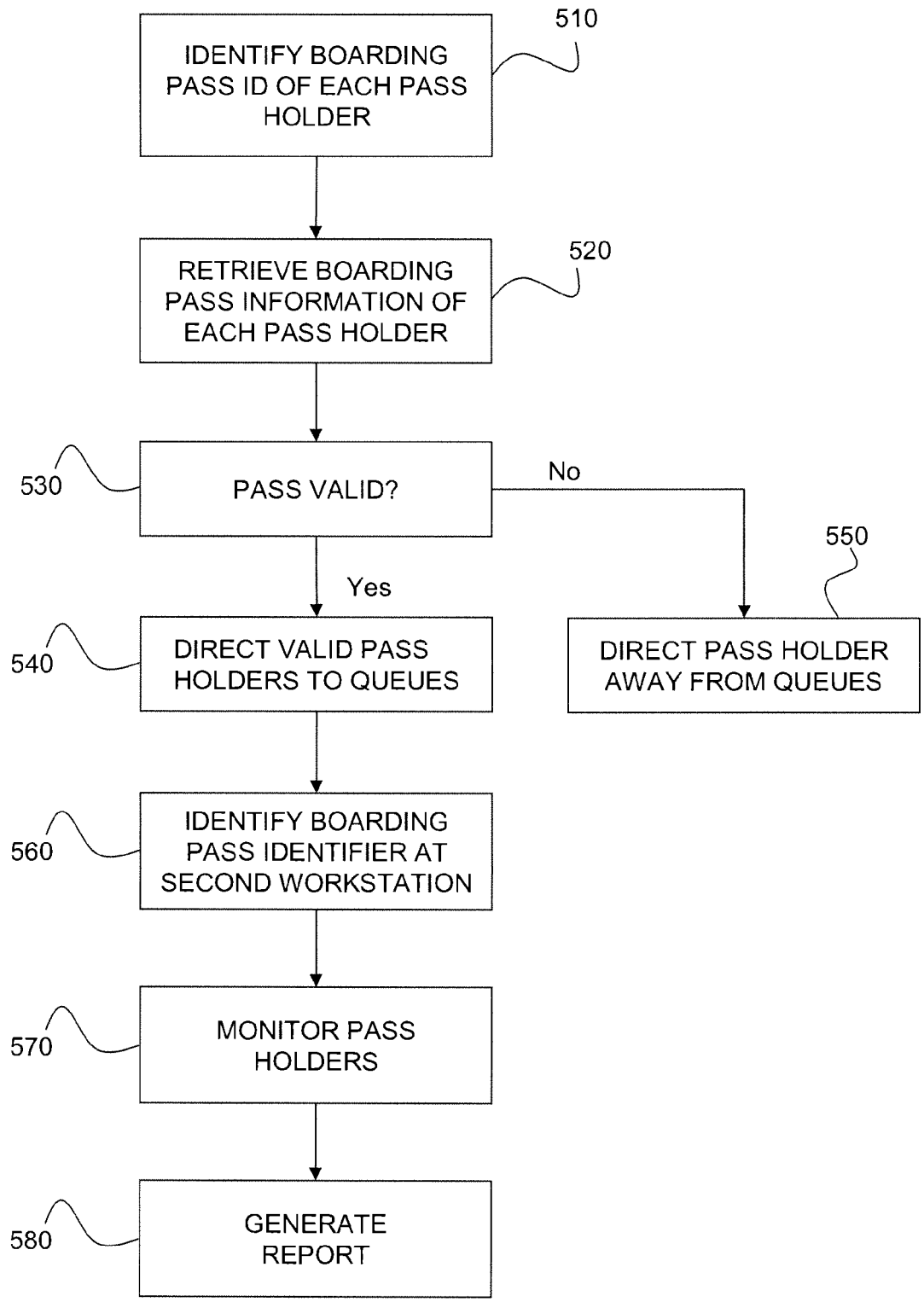

PASSENGER FLOW MONITORING METHOD AND SYSTEM

RELATED APPLICATIONS

This application claims priority from U.S. provisional application 61/297,703 filed on Jan. 22, 2010, the entire contents of which are incorporated by reference.

FIELD OF THE INVENTION

This invention relates to a computer implemented method for passenger flow monitoring and information processing and a system for the same.

BACKGROUND OF THE INVENTION

As a greater number of people pass through airport terminals every day, queues have become one of the main aggravations for passengers and staff alike. Coupled with increasingly stringent security procedures, this issue is further exacerbated. The ability to measure and manage queues at each stage of the passengers' journey is of paramount importance in maintaining efficient airport operations. Documentation of passenger movement patterns is also crucial to greater efficiency, when planning and optimizing of airport facilities, gates and services.

SUMMARY OF THE INVENTION

One aspect of the present invention relates to methods for passenger flow. An exemplary method comprises: electronically identifying a boarding pass identifier of a boarding pass at a workstation of one or more first workstations at a first level; electronically retrieving boarding pass information associated with the identified boarding pass identifier at the workstation; and determining, via one or more computers, whether the boarding pass is valid based on the retrieved boarding pass information; if the boarding pass is determined valid, directing, via one or more computers, a holder of the boarding pass to a queue for one workstation of a plurality of second workstations at a second level based on the retrieved boarding pass information, each workstation of the second workstations having a different queue arranged before the workstation; and if the boarding pass is determined not valid, directing the boarding pass holder away from entering the queues.

Another aspect of the present invention relates to a method of monitoring passenger flow. An exemplary method comprises: electronically identifying a boarding pass identifier of each of a plurality of boarding passes at a respective workstation of one or more workstations at a first level; electronically retrieving, for each boarding pass, boarding pass information associated with the identified boarding pass identifier at the workstation; and determining, for each boarding pass, via one or more computers, whether the boarding pass is valid based on the retrieved boarding pass information; directing, for each valid boarding pass, via one or more computers, a holder of the boarding pass to a queue for one workstation of a plurality of second workstations at a second level based on the retrieved boarding pass information, each workstation of the second workstations having a different queue arranged before the workstation; electronically identifying, for each valid boarding pass, the boarding pass identifier of the boarding pass at the one workstation of the plurality of second workstations at the second level; and monitoring the boarding pass holders in each queue based on the identifying of the boarding pass identifiers at the one or more work stations at the first level and the identifying of the boarding pass identifiers at the one or more work stations at the second level.

Another aspect of the present invention relates to a system for passenger flow. An exemplary system comprises: one or more first workstations arranged at a first level, each of the one or more first workstations configured to electronically identify a boarding pass identifier of a boarding pass; a plurality of second workstations at a second level, each workstation of the second workstations having a different queue arranged before the workstation; one or more computers configured to: retrieve boarding pass information associated with the boarding pass identifier identified at one of the first workstations; determine whether the boarding pass is valid based on the retrieved boarding pass information; if the boarding pass is determined valid, direct the holder of the boarding pass to a queue for one workstation of the plurality of second workstations; and if the boarding pass is determined not valid, direct the boarding pass holder away from entering the queues.

Another aspect of the present invention relates to a system for monitoring passenger flow. An exemplary system comprises: one or more first workstations arranged at a first level, each of the one or more first workstations configured to electronically identify a boarding pass identifier of a boarding pass; a plurality of second workstations at a second level, each workstation of the second workstations having a different queue arranged before the workstation, each workstation of the second workstations configured to electronically identify the boarding pass identifier of the boarding pass; one or more computers configured to: retrieve boarding pass information associated with the boarding pass identifier identified at one of the first workstations; determine whether the boarding pass is valid based on the retrieved boarding pass information; if the boarding pass is determined valid, direct the holder of the boarding pass to a queue for one workstation of the plurality of second workstations; and monitor boarding pass holders in each queue based on the identifying of the boarding pass identifiers at the one or more work stations at the first level and the identifying of the boarding pass identifiers at the one or more work stations at the second level.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 5 is a flow chart illustrating a method for monitoring passenger flow according to an embodiment of the present invention.

DETAILED DESCRIPTION OF THE PREFERRED EMBODIMENTS

Figure 1:
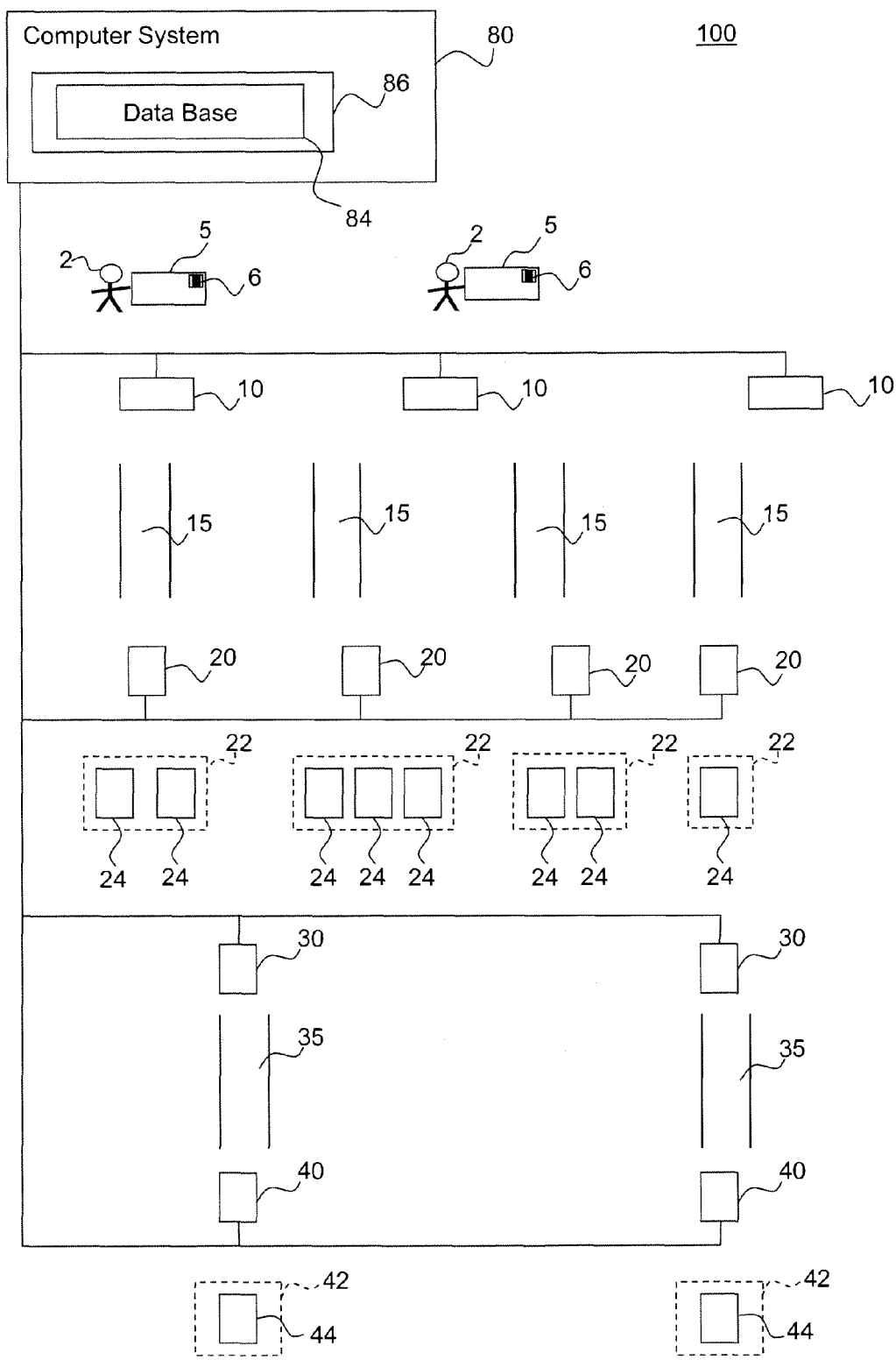
FIG. 1 is a schematic illustrating a passenger flow and monitoring system according to an embodiment of the present invention.

The invention is described below with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, and systems. The embodiments of the present invention may be implemented using an existing computer processor, or by a special purpose computer processor incorporated for this or another purpose or by a hardwired system.

Passenger Flow and Monitoring System

FIG. 1 illustrates a passenger flow and monitoring system 100 according to an exemplary embodiment of the present invention. The passenger flow system includes one or more workstations 10 arranged at a first level, a plurality of second workstations 20 arranged at second level, a plurality of third workstations 30 arranged at a third level, and a plurality of fourth workstations 40 arranged at a fourth level. While the passenger flow system as illustrated in FIG. 1 shows a four level system, in general, the levels also may be more or less than four. The passenger flow system 100 also includes a computer system 80, which may comprise one or more computers, and a database 84, such as a relational database, on one or more storage media 86, which may be part of the computer system 80, or may be separate therefrom.

In the system of FIG. 1, a number of queues 15 are arranged with one queue before each of the second workstations 20, and a number of queues 35 are arranged with one queue before each of the fourth workstations 40. Associated with each of the second workstations 20 is a respective passenger processing station 22, and associated with each of the fourth workstations 40 is a respective passenger further processing station 42.

In general, passengers holding a boarding pass, i.e., boarding pass holders 2, line up in the queues 15 waiting to proceed to respective passenger processing stations 22. The boarding pass holders themselves are not part of the system 100. Likewise, passengers holding a boarding pass, line up in the queues 35 waiting to proceed to respective passenger further processing stations 42. Each of the fourth workstations 40 has a respective queue 35 associated with it.

The passenger processing stations 22 may be any number of types of stations. For example, the passenger processing stations 22 may be security stations, luggage scanning stations, passport control stations, or flight terminal departure stations. Likewise, the passenger further processing stations 42 may be any number of types of stations, such as security stations, luggage scanning stations, passport control stations, or flight terminal departure stations. As one example, the passenger processing stations 22 may be security stations, and the passenger further processing stations 42 may be passport control stations, where the passengers pass through the security stations prior to the passport control stations. As another example, the passenger processing stations 22 may be security stations, and the passenger further processing stations 42 may be flight terminal departure stations, where the passengers pass through the security stations prior to the flight terminal departure stations.

Each of the passenger processing stations 22 may have one or more pieces of passenger processing equipment 24 associated with it. Likewise, each of the passenger further processing stations 42 may have one or more pieces of passenger further processing equipment 44 associated with it. The type of passenger processing equipment 24 will depend on the type of passenger processing station 22 associated with it. For example, if the passenger processing stations 22 are security checkpoints, the passenger processing equipment 24 may be X-ray machines, or other types of scanners. Likewise, the type of passenger further processing equipment 44 will depend on the type of passenger further processing station 42 associated with it.

One or more pieces of the passenger processing equipment 24 may be active or inactive at any one time depending on the circumstances. Likewise, one or more pieces of the passenger further processing equipment 44 may be active or inactive at any one time.

Figure 2:
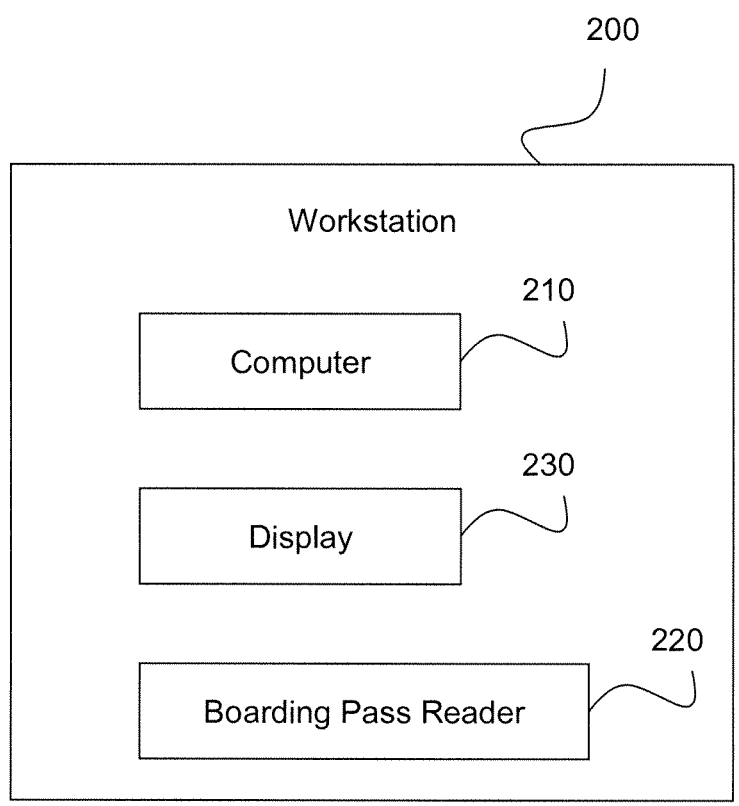
FIG. 2 illustrates a workstation according to the embodiment of the present invention of FIG. 1.

A passenger 2 holding a boarding pass 5 may have the boarding pass read at one of the workstations 10, 20, 30, or 40. In general, each of the workstations will include a boarding pass reader and a computer. For example, FIG. 2 illustrates a workstation 200 with a display 230, a boarding pass reader 220 and a computer 210. The workstation 200 identifies a boarding pass identifier of the boarding pass 5, when the boarding pass 5 is brought in proximity to the boarding pass reader 220. In this regard, the boarding pass 5 has a boarding pass identifier 6 as shown in FIG. 1. An exemplary boarding pass identifier 6 may comprise at least one of a two-dimensional bar code, a mobile phone code, a one-dimensional bar code, or a magnetic stripe. The boarding pass reader 220 reads the boarding pass identifier 6 by reading the magnetic stripe or optically scanning the two-dimensional bar code or the one-dimensional bar code, for example.

The workstations 10, 20, 30 and 40 may be self serve, where a passenger is expected to have the boarding pass 5 read without assistance, or they may be assisted work stations, where an assistant is stationed to read the boarding pass.

When the boarding pass 5 is read by the boarding pass reader 220, the boarding pass identifier 6 is electronically identified at the respective workstation. Based on the identified boarding pass identifier, one or more computers, such as computers of the computer system 80 and/or the computer 210 on the workstation 200, retrieve boarding pass information associated with the boarding pass 5. Electronically retrieving the boarding pass information may comprise accessing a database 84 on the one or more storage media 86 based on the identified boarding pass identifier, or electronically retrieving boarding pass information stored on the boarding pass itself. The storage media 86 may comprise hard disk drives, RAM, ROM, or other forms of media for storing information, as is known in the art.

Passenger Flow

Figure 3A:
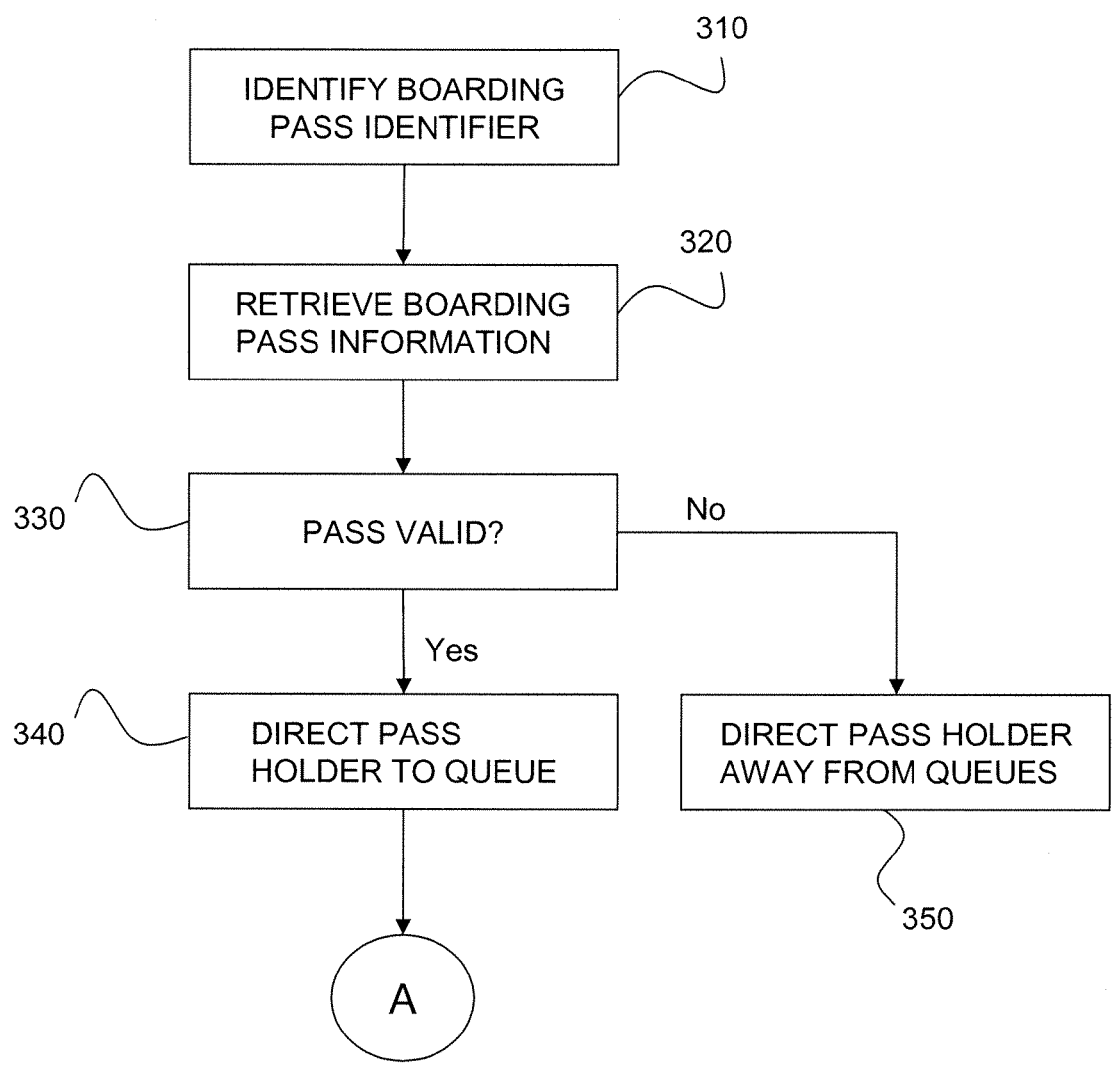
FIGS. 3A and 3B are flow charts illustrating a method for directing passenger flow according to an embodiment of the present invention.
Figure 3B:
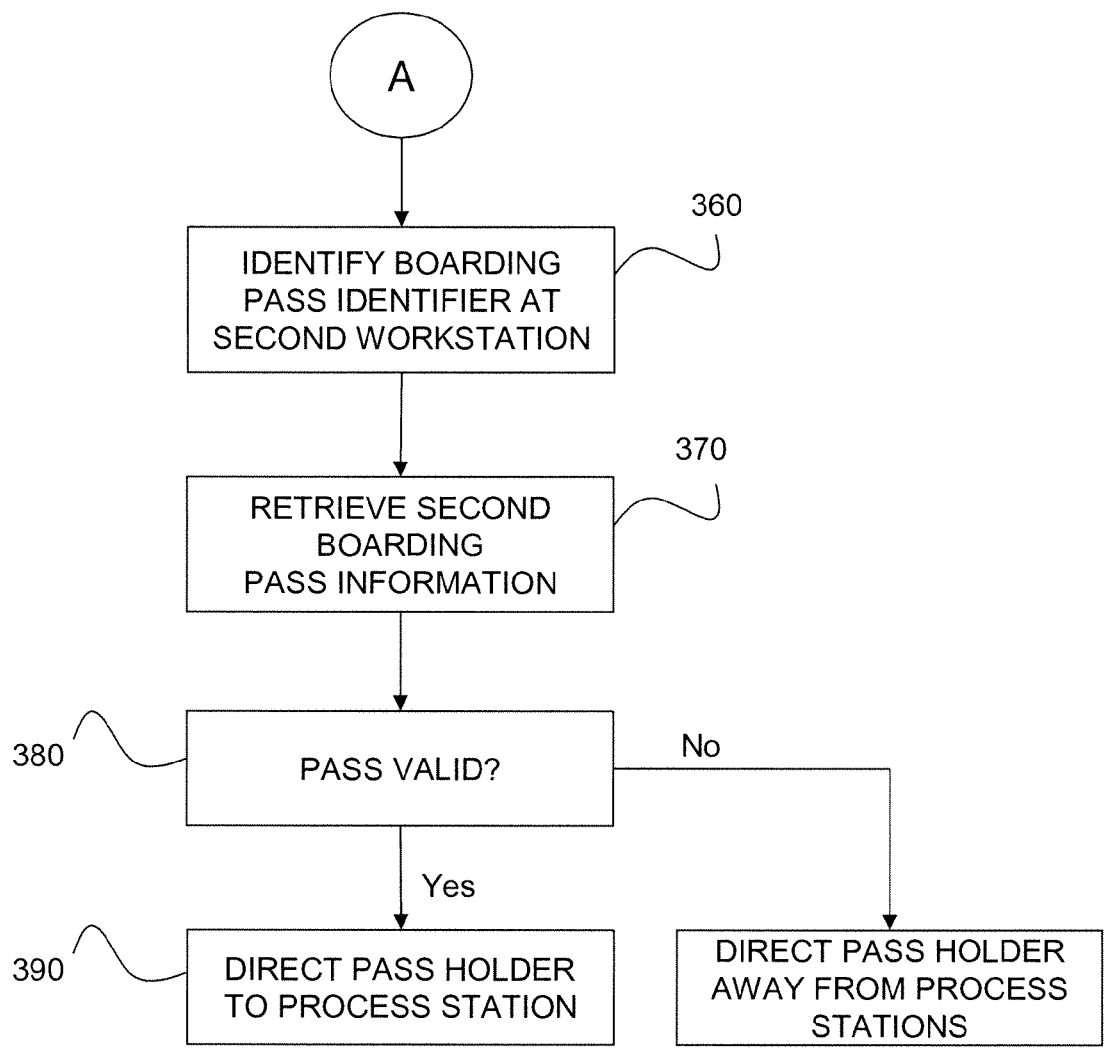

FIGS. 3A and 3B illustrate a method for directing passenger flow according to an embodiment of the invention, where the method is described with respect to the system of FIG. 1, which implements the method. In step 310, a boarding pass identifier 6 of a boarding pass 5 at a workstation of the workstations 10 at a first level is electronically identified. A passenger 2 brings the boarding pass 5 in proximity to the workstation 10 such that the boarding pass identifier is read, such as by reading a magnetic identifier if the identifier 6 is magnetic, by optically scanning, or by RFID detection, for example.

In step 320, boarding pass information associated with the boarding pass 6 is electronically retrieved based on the identified boarding pass identifier. Electronically retrieving the boarding pass information may include accessing a database on one or more storage media based on the identified boarding pass identifier. For example the database 84 may be accessed. Alternatively or additionally, electronically retrieving the boarding pass information may include electronically retrieving boarding pass information stored on the boarding pass itself. Alternatively or additionally, one or more extended databases may be accessed to obtain information.

The boarding pass information may include, for example, the identity of the pass holder, the time the boarding pass was read, the flight, flight departure time, flight destination, flight terminal, frequent flyer identification, or an identification indicating business or economy class. The frequent flyer identification identifies that the boarding pass holder is a frequent flyer. The identification indicating business or economy class identifies whether the seat for the boarding pass holder is business or economy class. The time the boarding pass was read may be added to the boarding pass, such as by stamping the boarding pass with the time, or storing the time on the boarding pass. Other boarding pass information may also be stored on the boarding pass.

In step 330, it is determined by one or more computers whether or not the boarding pass 5 is valid based on the retrieved boarding pass information. The computers may be part of the computer system 80 as shown in FIG. 1, and/or may include computer 210 of the workstation 200 as shown in FIG. 2. For example, the boarding pass may be determined to be not valid based on a flight departure time not being within an acceptable range, a flight terminal being an incorrect terminal for a flight identified, a format of the identification boarding pass identifier being invalid, a duplication of the boarding pass identifier with another boarding pass identifier, or an identity of the pass holder on an inhibited list. The boarding pass may also be determined to be invalid based on the flight departure time not being within an acceptable range, for example, if the pass holder is too early or too late for boarding the flight, e.g., a threshold amount of time before or after a boarding time. The boarding pass may be determined to be invalid based on the duplication of the boarding pass identifier with another boarding pass identifier, which indicates that the boarding pass identifier has already been used by another boarding pass holder, for example. The boarding pass may be determined to be invalid based on a flight terminal being an incorrect terminal for a flight identified. The boarding pass may be determined to be invalid based on a format of the identification boarding pass identifier being invalid. The boarding pass may also be determined to be invalid based on the pass holder being on an inhibited list, which inhibits that pass holder from taking the particular flight associated with the boarding pass identifier.

If the boarding pass 5 is determined valid in step 330, the process proceeds to step 340. In step 340, the boarding pass holder is directed, via one or more computers, to one of the queues 15 leading to a respective one of the workstations 20 at the second level based on the retrieved boarding pass information. The computers may be part of the computer system 80 as shown in FIG. 1, and/or may include computer 210 of the workstation 200 as shown in FIG. 2. The boarding pass holder may be directed to an appropriate queue using the display 230 at the workstation. For example, if the appropriate queue is the second queue of the queues 15, the display may be provided to display "QUEUE 2" or "LINE 2". Alternatively or additionally, information on the queue assignment may be added to the boarding pass electronically or via a stamp or other printing mechanism.

The boarding pass holder may be directed to an appropriate queue as desired based on a number of criteria. For example, boarding pass holders with boarding pass information indicating that the flight departure time is soon, or the holder is a frequent flyer, or the holder has a seat in business class may be directed to queues with fewer numbers of pass holders in the queue or the fastest queues. In the case where the flight departure time is very soon, assisting personnel may additionally be notified to assist the boarding pass holder in boarding the flight in a timely manner. Boarding pass holders where the flight departure time is far way, may be directed to queues with larger numbers of pass holders in the queue or the slowest queues.

As another example, boarding pass holders with boarding pass information indicating particular flights, or flight destinations, may be subject to special security checks. In this case, the boarding pass holder is directed to queues leading to passenger processing stations with such special security checks.

If the boarding pass 5 is determined not valid in step 330, the process proceeds to step 350. In step 350, the boarding pass holder is directed away from the queues 15, and may be directed to a help desk, for example. A notification directing the boarding pass holder is issued. The notification may be made at the display 230 of the workstation 200, for example, such as by displaying an indication that the boarding pass is invalid along with an explanation, and directing the boarding pass holder to a help desk. Alternatively or additionally, the notification may be added to the boarding pass electronically or via a stamp or other printing mechanism. Additionally, or alternatively, the notification may be made at a location other than the workstation. For example, airport staff may be notified to assist the boarding pass holder, and/or security personnel may be notified that a pass holder on an inhibited list has been identified at a workstation. In one embodiment, the boarding pass may provide a visual, e.g., color or printing, or audio, e.g., a buzzer, if the boarding pass has entered the wrong queue.

When the boarding pass holder reaches an end of one of the queues 15, the boarding pass identifier 6 of the boarding pass 5 at a workstation of the second workstations 20 is electronically identified as shown in step 360. The passenger 2 brings the boarding pass 5 in proximity to the workstation 20 such that the boarding pass identifier is read, such as by reading a magnetic identifier if the identifier 6 is magnetic, by optically scanning, or by RFID, for example.

In step 370, second boarding pass information associated with the boarding pass is electronically retrieved based on the identified boarding pass identifier. Electronically retrieving the second boarding pass information may include accessing a database on one or more storage media based on the identified boarding pass identifier. For example, the database 84 may be accessed. Alternatively or additionally, electronically retrieving the second boarding pass information may include electronically retrieving boarding pass information stored on the boarding pass itself.

The second boarding pass information may include, for example, whether or not the boarding pass identifier was identified at a first workstation 10, the queue the pass holder was assigned to, the identity of the pass holder, the time the boarding pass was read, the flight, flight departure time, flight destination, flight terminal, frequent flyer identification, or an identification indicating business or economy class.

In step 380 it is determined by one or more computers whether or not the boarding pass 5 is valid based on the retrieved second boarding pass information. The computers may be part of the computer system 80 as shown in FIG. 1, and/or may include computer 210 of the workstation 200 as shown in FIG. 2. For example, the boarding pass is determined to be not valid based on a flight departure time not being within an acceptable range, a flight terminal being an incorrect terminal for a flight identified, a format of the identification boarding pass identifier being invalid, a duplication of the boarding pass identifier with another boarding pass identifier, or an identity of the pass holder on an inhibited list, in a similar fashion to step 330. Additionally, the boarding pass may be determined to be not valid based on the pass holder being in the incorrect queue, or the pass holder not having scanned the boarding pass at the workstation at the first level.

If the boarding pass 5 is determined valid in step 380, the process proceeds to step 390. In step 390, the boarding pass holder is directed, via one or more computers, to the passenger process station 22 associated with the workstation 20 at the end of the queue 15. The computers may be part of the computer system 80 as shown in FIG. 1, and/or may include computer 210 of the workstation 200 as shown in FIG. 2. The boarding pass holder may be directed to a passenger process station 22 using the display 230, or other appropriate means. For example, the display may be provided to read "PLEASE ENTER PROCESS STATION."

If the boarding pass 5 is determined not valid in step 380, the process proceeds to step 395. In step 395, the boarding pass holder is directed away from the passenger process station 22, and may be directed to a help desk, for example. A notification directing the boarding pass holder is issued. The notification may be made at the display 230 of the workstation 200, for example, such as by displaying an indication that the boarding pass is invalid along with an explanation, and directing the boarding pass holder to a help desk. This may also be done by printing information on the boarding pass or another media. Additionally, or alternatively, the notification may be made at a location other than the workstation. For example, airport staff may be notified to assist the boarding pass holder, and/or security personnel may be notified that a pass holder on an inhibited list has been identified at a workstation.

Whether or not the boarding pass is determined to be valid or invalid in steps 330 and 380, the results of scanning the boarding pass may be stored, for example on the boarding pass itself and/or the database 84.

Figure 4:
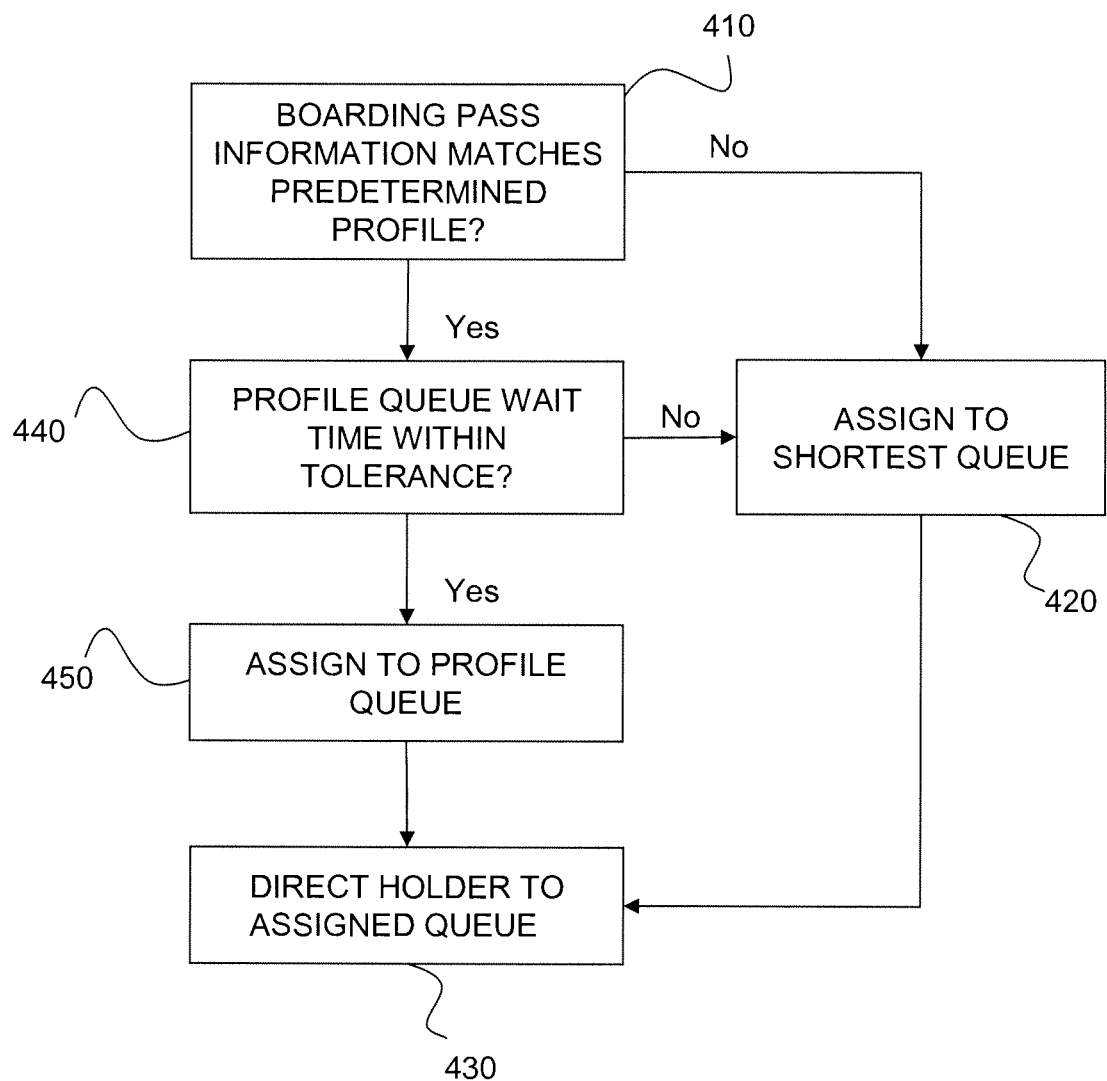
FIG. 4 is a flow chart illustrating details of the directing step of FIG. 3A according to an embodiment of the present invention.

FIG. 4 illustrates exemplary details of step 340 in the case that the boarding pass holder is directed to an appropriate queue as desired based on a number of criteria of a profile, where the boarding pass information is checked against the profile. In step 410 it is determined whether the boarding pass information matches with a predetermined profile, such as a late passenger, early passenger, or business passenger profile. For example a business passenger profile may have a departure time of 5-9 PM on Monday through Friday to certain destinations.

If no profile is matched in step 410, the boarding pass holder may be assigned to the shortest available queue in step 420, and the boarding pass holder directed to the queue in step 430.

If a profile is matched in step 410, a profile queue may be assigned depending on whether the profile queue wait time is within a tolerance as in step 440, where the tolerance value represents the maximum allowed difference between the queue associated with the profile, and shortest queue available. If the tolerance is exceeded, the boarding pass holder may be assigned to the shortest available queue (step 420) instead of the profile queue. Otherwise the profile queue is assigned (step 450), and the boarding pass holder is directed to the assigned queue (step 430).

FIGS. 3A, 3B and 4 illustrate a method of managing passenger flow from the workstations 10 at the first level through the queues 15 to the second workstations 20 at the second level, and then the passenger processing stations 22 associated with the second work stations. The method may be extended to further include managing passenger flow from the workstations 30 at the third level through the queues 35 to the fourth workstations 40 at the fourth level, and then the passenger further processing stations 42 associated with the fourth work stations in an analogous manner to that shown in FIGS. 3A, 3B and 4.

Passenger Monitoring and Reports

FIG. 5 illustrates a method for monitoring passenger flow according to an embodiment of the invention, where the method is described with respect to the system of FIG. 1, which implements the method.

In step 510, a boarding pass identifier is electronically identified for the boarding passes of different pass holders at the workstations 10 at the first level, as the pass holders arrive at the workstations 10 to have their pass read. This process is described in step 310 of FIG. 3A for a particular pass holder, for example.

In step 520, boarding pass information associated with the boarding pass is electronically retrieved for each pass holder based on the boarding pass identifier identified. This process is described in step 320 of FIG. 3A for a particular pass holder, for example.

In step 530, it is determined, for each boarding pass, via one or more computers, whether the boarding pass is valid based on the retrieved boarding pass information. This process is described in step 330 of FIG. 3A for a particular pass holder, for example. If the pass is determined to be invalid, the pass holder is directed away from the queues in step 550, in a similar fashion to step 350 in FIG. 3A. If the pass is determined to be valid the method continues to step 540.

In step 540, a holder of the boarding pass is directed, for each valid boarding pass, via one or more computers, to a queue for one workstation of the second workstations 20 at a second level based on the retrieved boarding pass information. This process is described in step 340 of FIG. 3A for a particular pass holder, for example.

In step 560, for each valid boarding pass, the boarding pass identifier of the boarding pass is electronically identified at a second workstation 20. This process is described in step 360 of FIG. 3B for a particular pass holder, for example.

In step 570, boarding pass holders in each queue are monitored based on the identifying of the boarding pass identifiers at work stations 10 at the first level and the identifying of the boarding pass identifiers at the work stations 20 at the second level. In this case, the monitoring may include identifying which, and how many customers are in the queues 15 as a function of time. Based on the monitoring, information such as the time each passenger spends in a queue, and the number of passengers in each queue may be determined.

In step 580, one or more reports may be generated based on the monitoring in step 570. The reports may be generated to have information as desired. For example, a report may include at least one of, the average number of boarding pass holders in a queue as a function of time over a period of time, or the average wait time in a queue of a pass holder as a function of time over a period of time. The reports may be used to provide an historical analysis of the flow of passengers at the airport, which may be used for prediction purposes.

The report may include the amount of active passenger processing equipment at each passenger processing station. In this way, the airport staff may be able to plan or adjust for the amount of active passenger processing equipment as needed during a day.

The report may include a listing of one or more flights, the passenger capacity of the flight, and the number of passengers for the flight which have arrived at the airport. In this way real time information regarding passengers for the flight may be provided.

The report may comprise an alert when some threshold number of invalid passes have been determined, or when a threshold number of passengers meeting a specified profile are detected.

Selected embodiments of the above system and methods provide one or more of the following advantageous features including: reading of multiple boarding pass types, pass validation, auditable records of when a pass was read, simple user interface, queuing priority, queue time monitoring and reporting, in-depth reporting of passenger volumes, time and flow analysis, airline enquiry, remote monitoring of passenger flow and volume, and ready integration with various databases.

Selected embodiments of the above system and methods further provide one or more of: reducing errors associated with manual handling of boarding passes, improving and analysis of passenger flow, better planning of shifts and manpower based on prediction of passenger arrival time, reducing disruption of late arriving passengers by alerting staff earlier, validating entry of boarding passes to avoid multiple entries, ability to create special queues for certain flights, ability to run an inhibited list to alert, or refuse, entries to the airside.

The above system and methods provide airports with real-time accurate intelligence on passenger journey and queue lines, and allows for precise and efficient control of terminal operations, including management of resources, and efficient tactical deployment and strategic planning of terminal processes and layout.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for passenger flow, comprising:
   electronically identifying a boarding pass identifier of a boarding pass at a workstation of one or more first workstations at a first level;
   electronically retrieving boarding pass information associated with the identified boarding pass identifier at the workstation; and
   determining, via one or more computers, whether the boarding pass is valid based on the retrieved boarding pass information;
   if the boarding pass is determined valid, directing, via one or more computers, a holder of the boarding pass to a queue for one workstation of a plurality of second workstations at a second level based on the retrieved boarding pass information, each workstation of the second workstations having a different queue arranged before the workstation; and
   if the boarding pass is determined not valid, directing the boarding pass holder away from entering the queues,
   wherein the directing the holder of the boarding pass to a queue comprises:
   determining whether the retrieved boarding pass information matches with a predetermined profile;
   if the retrieved boarding pass information does not match with a predetermined profile, assigning the pass holder to a shortest queue;
   if the retrieved boarding pass information matches with a predetermined profile, determining whether a profile queue wait time is within a tolerance;
   if the profile queue wait time is within the tolerance, assigning the pass holder to a profile queue; and
   if the profile queue wait time is not within the tolerance, assigning the pass holder to the shortest queue.

2. The method of claim 1, wherein the electronically retrieving the boarding pass information comprises at least one of accessing a database on one or more storage media based on the identified boarding pass identifier, or electronically retrieving boarding pass information stored on the boarding pass.

3. The method of claim 1, wherein the boarding pass is determined to be not valid based on at least one of a flight departure time not being within an acceptable range, a flight terminal being an incorrect terminal for a flight identified, a format of the identification boarding pass identifier being invalid, a duplication of the boarding pass identifier with another boarding pass identifier, or an identity of the pass holder on an inhibited list.

4. The method of claim 3, wherein the boarding pass is determined to be not valid based on an identity of the pass holder on an inhibited list, and further comprising issuing a notification to security.

5. The method of claim 1, wherein each of the plurality of second workstations is associated with a respective passenger processing station of a plurality of passenger processing stations.

6. The method of claim 5, wherein each of the passenger processing stations is at least one of a security station, a luggage scanning station, a passport control station, or a flight terminal departure station.

7. The method of claim 5, wherein each of the passenger processing stations has passenger processing equipment.

8. The method of claim 5, wherein each of multiples of the passenger processing stations is a security station.

9. The method of claim 8, wherein each of the security stations has passenger security processing equipment.

10. The method of claim 1, wherein multiples of first and second workstations are self serve or assisted work stations.

11. The method of claim 1, further comprising:
    electronically identifying the boarding pass identifier of the boarding pass at the one second workstation;
    electronically retrieving second boarding pass information associated with the identified boarding pass identifier at the one second workstation;
    determining, via one or more computers, whether the boarding pass is valid based on the retrieved second boarding pass information;
    if the boarding pass is determined valid, directing, via one or more computers, a holder of the boarding pass to a passenger process station associated with the one second workstation; and if the boarding pass is determined not valid, directing the boarding pass holder away from entering the passenger process station associated with the one workstation.

12. The method of claim 11, further comprising:
electronically identifying a boarding pass identifier of the boarding pass at a workstation of one or more third workstations at a third level;
electronically retrieving third boarding pass information associated with the identified boarding pass identifier at the workstation of the one or more third workstations at the third level;
determining, via one or more computers, whether the boarding pass is valid based on the retrieved third boarding pass information;
if the boarding pass is determined valid, directing, via one or more computers, a holder of the boarding pass to a queue for one workstation of a plurality of fourth workstations at a fourth level based on the retrieved third boarding pass information, each workstation of the fourth workstations having a different queue arranged before the workstation; and
if the boarding pass is determined not valid, directing the boarding pass holder away from entering the queues.

13. The method of claim 1, wherein the retrieved boarding pass information comprises at least one of a flight departure time, a frequent flyer identification, a flight, a flight destination, or an identification indicating business or economy class, where the queue the pass holder is directed to is based on the at least one of the flight departure time, the frequent flyer identification, the flight, the flight destination, or the identification indicating business or economy class.

14. The method of claim 13, wherein the retrieved boarding pass information comprises at least one of a flight, or a flight destination, where the queue the pass holder is directed to is based on the at least one of the flight, or the flight destination, and the queue the pass holder is directed to is associated with a passenger processing station with special security checks.

15. The method of claim 1, wherein the electronically identifying a boarding pass identifier comprises at least one of reading a magnetic identifier, optically scanning an identifier, or RFID detection of an identifier.

16. The method of claim 1, wherein the boarding pass identifier comprises at least one of a two-dimensional bar code, a mobile phone code, a one-dimensional bar code, or a magnetic stripe.

17. The method of claim 11,
wherein the boarding pass is determined to be not valid based on the retrieved second boarding pass information based on at least one of a flight departure time not being within an acceptable range, a flight terminal being an incorrect terminal for a flight identified, a format of the identification boarding pass identifier being invalid, a duplication of the boarding pass identifier with another boarding pass identifier, the pass holder being in the incorrect queue, the pass holder not having scanned the boarding pass at the workstation at the first level, or an identity of the pass holder on an inhibited list.

18. A method for monitoring passenger flow, comprising:
electronically identifying a boarding pass identifier of each of a plurality of boarding passes at a respective workstation of one or more workstations at a first level;
electronically retrieving, for each boarding pass, boarding pass information associated with the identified boarding pass identifier at the workstation; and
determining, for each boarding pass, via one or more computers, whether the boarding pass is valid based on the retrieved boarding pass information;
directing, for each valid boarding pass, via one or more computers, a holder of the boarding pass to a queue for one workstation of a plurality of second workstations at a second level based on the retrieved boarding pass information, each workstation of the second workstations having a different queue arranged before the workstation;
electronically identifying, for each valid boarding pass, the boarding pass identifier of the boarding pass at the one workstation of the plurality of second workstations at the second level;
monitoring the boarding pass holders in each queue based on the identifying of the boarding pass identifiers at the one or more work stations at the first level and the identifying of the boarding pass identifiers at the one or more work stations at the second level; and
generating a report, via one or more computers, based on the monitoring the boarding pass holders in each queue, wherein the report includes the average number of boarding pass holders in a queue as a function of time over a period of time.

19. The method of claim 18, further comprising determining the time each passenger spends in a queue based on the monitoring.

20. The method of claim 18, further comprising determining the number of passengers in each queue based on the monitoring.

21. The method of claim 18, wherein each of the plurality of second workstations is associated with a respective passenger processing station of a plurality of passenger processing stations, and each of the passenger processing stations has passenger processing equipment.

22. The method of claim 18 wherein the report includes the average wait time in a queue of a pass holder as a function of time over a period of time.

23. The method of claim 22 wherein each of the plurality of second workstations is associated with a respective passenger processing station of a plurality of passenger processing stations, each of the passenger processing stations has passenger processing equipment, and the report includes the amount of active passenger processing equipment at each passenger processing station.

24. The method of claim 18 wherein the report includes a listing of one or more flights, the passenger capacity of the flight, and the number of passengers on the flight.

25. A system for passenger flow, comprising:
one or more first workstations arranged at a first level, each of the one or more first workstations configured to electronically identify a boarding pass identifier of a boarding pass;
a plurality of second workstations at a second level, each workstation of the second workstations having a different queue arranged before the workstation;
one or more computers configured to:
retrieve boarding pass information associated with the boarding pass identifier identified at one of the first workstations;
determine whether the boarding pass is valid based on the retrieved boarding pass information;
if the boarding pass is determined valid, direct the holder of the boarding pass to a queue for one workstation of the plurality of second workstations;
if the boarding pass is determined not valid, direct the boarding pass holder away from entering the queues,
determine whether the retrieved boarding pass information matches with a predetermined profile;

if the retrieved boarding pass information does not match with a predetermined profile, assign the pass holder to a shortest queue;

if the retrieved boarding pass information matches with a predetermined profile, determine whether a profile queue wait time is within a tolerance;

if the profile queue wait time is within the tolerance, assign the pass holder to a profile queue; and if the profile queue wait time is not within the tolerance, assign the pass holder to the shortest queue.

26. The system of claim 25, wherein the one workstation of the plurality of second workstations is configured to electronically identify the boarding pass identifier of the boarding pass at the one second workstation; and wherein the one or more computers are further configured to:

electronically retrieve second boarding pass information associated with the boarding pass identifier identified at the one second workstation;

determine whether the boarding pass is valid based on the retrieved second boarding pass information;

if the boarding pass is determined valid, direct a holder of the boarding pass to a passenger process station associated with the one workstation of the plurality of second workstations; and if the boarding pass is determined not valid, direct the boarding pass holder away from entering the passenger process station associated with the one second workstation.

27. The system of claim 26, further comprising:

one or more third workstations at a third level, each of the one or more third workstations configured to electronically identify a boarding pass identifier of the boarding pass;

a plurality of fourth workstations at a fourth level, each workstation of the fourth workstations having a different queue arranged before the workstation;

wherein the one or more computers are further configured to:

electronically retrieve third boarding pass information associated with the boarding pass identifier identified at a workstation of the one or more third workstations;

determine whether the boarding pass is valid based on the retrieved third boarding pass information;

if the boarding pass is determined valid, direct a holder of the boarding pass to a queue for one workstation of the plurality of fourth workstations based on the retrieved third boarding pass information; and if the boarding pass is determined not valid, direct the boarding pass holder away from entering the queues.

28. A system for monitoring passenger flow, comprising:

one or more first workstations arranged at a first level, each of the one or more first workstations configured to electronically identify a boarding pass identifier of a boarding pass;

a plurality of second workstations at a second level, each workstation of the second workstations having a different queue arranged before the workstation, each workstation of the second workstations configured to electronically identify the boarding pass identifier of the boarding pass;

one or more computers configured to:

retrieve boarding pass information associated with the boarding pass identifier identified at one of the first workstations;

determine whether the boarding pass is valid based on the retrieved boarding pass information;

if the boarding pass is determined valid, direct the holder of the boarding pass to a queue for one workstation of the plurality of second workstations;

monitor boarding pass holders in each queue based on the identifying of the boarding pass identifiers at the one or more work stations at the first level and the identifying of the boarding pass identifiers at the one or more work stations at the second level; and generate a report, via one or more computers, based on the monitoring the boarding pass holders in each queue, wherein the report includes the average number of boarding pass holders in a queue as a function of time over a period of time.

\* \* \* \* \*